C. B. SCHOENMEHL.
PRIMARY BATTERY.
APPLICATION FILED DEC. 24, 1914.
1,258,473.
Patented Mar. 5, 1918.
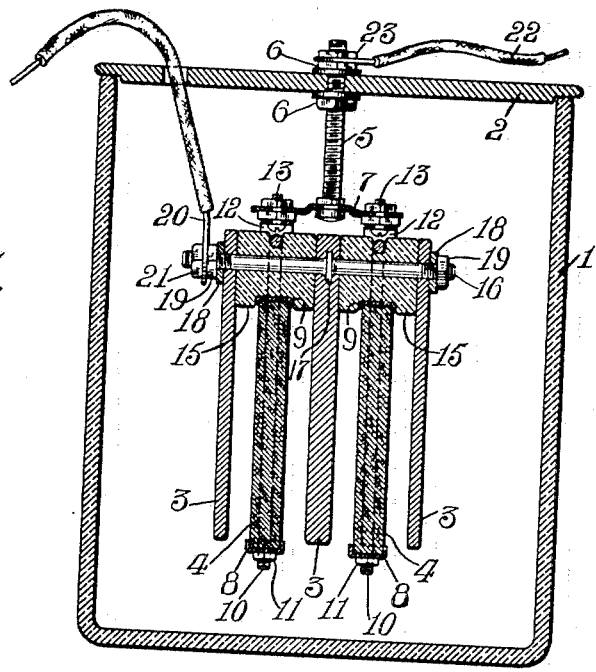
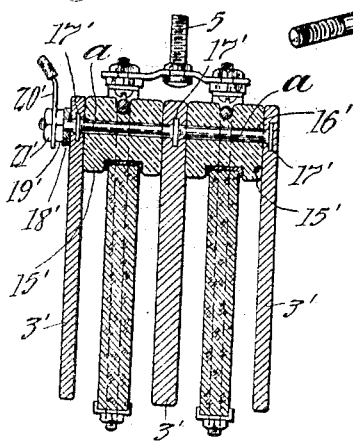
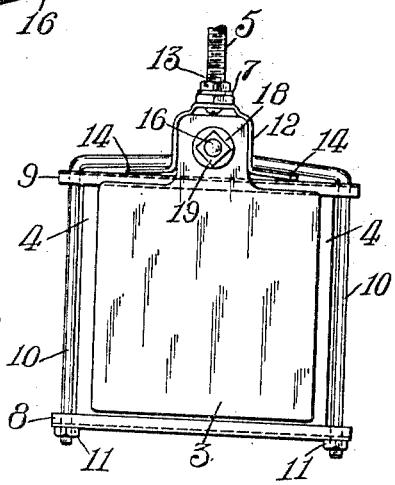
Witnesses:
Ruth M. Norden
E. Earle Garlick
Inventor:
Charles B. Schoenmehl,
By Chamberlain & Newman
His Attys.

ly patent office.

CHARLES B. SCHOENMEHL, OF WATERBURY, CONNECTICUT.

PRIMARY BATTERY.

1,258,473. Specification of Letters Patent. Patented Mar. 5, 1918.

Application filed December 24, 1914. Serial No. 878,954.

*To all whom it may concern:*

Be it known that I, CHARLES B. SCHOEN-MEHL, a citizen of the United States, and resident of Waterbury, in the county of New Haven and State of Connecticut, have invented certain new and useful Improvements in Primary Batteries, of which the following is a specification.

My invention relates generally to primary batteries and in some aspects is an improvement on the battery shown and described in Letters Patent No. 1,080,483, granted to me December 2, 1913. The object of my invention is to make more effective the contact between the positive elements and the current conducting and supporting means associated therewith, and to permit the mounting of a plurality of positive and negative electrodes in coöperative relation with one another, under the improved conditions of contact referred to, without preventing or otherwise interfering with the use of such insulating and supporting means as may be necessary to keep the two sets of electrodes supported and electrically separated from each other. More particularly, my invention relates to an improved mechanical and electrical connection between the supporting through bolt or rod and the zinc plate or plates supported thereby.

For a further description of my invention, reference is had to the drawings accompanying and forming a part of this specification, and in which:—

Figure 1 is a vertical section through a primary battery embodying my invention;

Fig. 2 is an end view of the electrode structure shown in Fig. 1;

Fig. 3 is a perspective view of the through bolt or rod employed in the structure illustrated in Figs. 1 and 2; and Fig. 4 is a vertical section through a modified form of electrode structure embodying my invention.

Referring particularly to Figs. 1, 2 and 3, numeral 1 indicates the jar or container of a battery and the numeral 2 indicates the cover for the same. The jar receives and contains a suitable electrolyte for coöperation with positive zinc electrodes 3 and negative electrodes 4 formed of compressed copper oxid. The positive and negative electrodes are arranged alternately and are supported or suspended from a bolt or stem 5 passing through a hole in the cover 2 and fastened to the cover by means of lock nuts 6. At its lower end inside the jar 1 the stem 5 has a head which supports a yoke 7, a suitable lock nut being used to force the middle of the yoke against the head. The negative electrodes 4 are carried between upper and lower horizontal channel pieces 9 and 8 supported by yokes 10 which pass through the ends of the channel pieces and have their lower ends threaded to receive nuts 11. The yokes 10 pass through spring clips 12 which are U-shaped in form, inverted and fastened at their mid-points to the ends of the yoke 7 by means of short bolts or screws 13. These bolts may have spacing nuts between the clips 12 and the yoke 7 and receive lock nuts at their upper ends to secure the clips 12 to the yoke as tightly as may be required. The ends of the clips 12 are bent outward as shown at 14 and these ends 14 press upon the channel pieces 9 and thus these upper channel pieces 9 are forced down upon the upper edges of the electrodes 4. In this way the electrodes 4 are kept in intimate contact with the lower channel pieces 8 and these channel pieces rest securely upon the nuts 11. The clips 12 are provided with holes through which the middle portions of the yokes pass.

Between the positive electrodes 3 at the upper ends thereof are placed insulating sleeves or bushings 15 and through these bushings a through bolt or rod 16 is extended which secures the electrodes 3 and the bushings 15 together mechanically and also serves to connect the positive electrodes 3 electrically. The bottoms of these sleeves engage the top channel pieces 9 and may be grooved on their upper faces to receive the middle portions of the yokes 10, and they are preferably shaped to fit into the clips 12 and be snugly engaged thereby.

In order to provide more perfect contact between the middle electrode 3 and the bolt or rod 16, the middle electrode 3 is cast on this bolt. Furthermore, I preferably provide the bolt or rod 16 with a suitable enlarged portion or laterally extending projection 17 in the middle thereof and preferably integral therewith, and cast the middle electrode 3 on the bolt 16 around this projection, whereby I not only obtain substantially perfect electrical contact, but I also make the bolt or rod and the conductive element or electrode 3 rigid with respect to each other. This projection may have any shape, but I prefer to make it in the form of a square or other polygonal or angularly shaped flange or collar 17 and when the middle electrode 3 is cast around this collar, the electrode cannot revolve around the bolt or rod or move along the same. The projection may be formed by swaging, upsetting or in any other suitable manner.

As will be readily understood, the outside electrodes 3 are simply perforated and slipped over the opposite ends of the bolt or rod 16, and secured in position by means of nuts 19 screwed on the ends of the bolt, the said ends being threaded and washers or disks 18 being interposed between the nuts and the end electrodes 3 if desired. I secure one of the conducting leads 20 to the bolt by a nut 21 and the other lead 22 is secured to the stem 5 by means of a nut 23. Thus, all the positive electrodes are connected together and to the wire 20, and all the negative electrodes 4 are connected together and to the wire 22, while at the same time all the negative electrodes are insulated from all the positive electrodes. As in the structure shown in my prior Patent No. 1,080,483, the inner positive plate 3 is made of substantially double the thickness of the outer positive plates 3, to provide an increased amount of material to suitably work out the adjacent sides of the two negative plates and thus insure all parts of the battery running out equally.

In Fig. 4 there is illustrated an electrode structure similar to that of Figs. 1 and 2, but differing therefrom in that the through bolt or rod 16' is provided with a plurality of collars or projections 17' around each of which a zinc plate 3' is cast. One end of the bolt is extended through one of the outside zinc plates, and is threaded to receive the nuts 19' and 21' between which the lead 20' is connected. A conducting washer 18' may be employed if desired between the nut 19' and the adjacent zinc plate. In order to permit assembly of the parts, each of the insulating blocks 15' may be made in two parts, with the dividing surface between said parts passing through the bolt, as for example, in a horizontal plane, as is indicated by the dotted line $a, a$. By having each of said insulators split or made in parts, the insulator may be readily applied to the portion of the bolt between any pair of adjacent zinc plates in assembling the structure.

I do not wish to be restricted to the exact structure above described, but desire to reserve to myself the right to make any changes in the shape, size or arrangement of parts such as fairly fall within the scope and spirit of my invention as set forth in the claims appended hereto.

Having now described my invention, what I claim as new and desire to protect by Letters Patent is as follows:—

1. In a primary battery, a rod of electrically conductive material for supporting a battery plate, said rod having a projection, and a battery plate of electrically conductive material cast around a portion of said rod including the projection, thereby affording substantially perfect contact between said rod and plate and preventing the relative movement thereof, substantially as described.

2. In a primary battery, a rod of electrically conductive material for supporting a battery plate, said rod having an angular flange or collar, and a battery plate of electrically conductive material cast around said flange or collar, substantially as described.

3. In a primary battery, a through bolt for supporting the battery plates, said bolt being provided with a lateral projection, and a zinc battery plate cast around a portion of said bolt including said projection, substantially as described.

4. In a primary battery, a plurality of positive and negative elements alternately arranged, and means for supporting said elements and for insulating the elements of opposite polarity from each other, including a conducting rod by which all of said elements are supported, one or more of said elements being cast directly on said rod, substantially as described.

Signed at Waterbury, in the county of New Haven and State of Connecticut, this 18 day of December, A. D., 1914.

CHARLES B. SCHOENMEHL.

Witnesses:
FRANCIS T. REEVES,
HULDA M. SWENSON.

Copies of this patent may be obtained for five cents each, by addressing the "Commissioner of Patents, Washington, D. C."